United States Patent
Eden

(10) Patent No.: US 7,909,501 B2
(45) Date of Patent: Mar. 22, 2011

(54) SAFETY SYSTEM PREVENTING ROTATION OF UNPROTECTED CUTTING TOOL

(75) Inventor: Roland Eden, Havant (GB)

(73) Assignee: Kenwood Limited, Hampshire (GB)

( * ) Notice: Subject to any disclaimer, the term of this patent is extended or adjusted under 35 U.S.C. 154(b) by 1028 days.

(21) Appl. No.: 11/574,032

(22) PCT Filed: Aug. 3, 2005

(86) PCT No.: PCT/GB2005/003044
§ 371 (c)(1),
(2), (4) Date: Mar. 28, 2007

(87) PCT Pub. No.: WO2006/021742
PCT Pub. Date: Mar. 2, 2006

(65) Prior Publication Data
US 2008/0093193 A1    Apr. 24, 2008

(30) Foreign Application Priority Data
Aug. 26, 2004    (GB) .................................. 0419036.9

(51) Int. Cl.
A47J 43/046    (2006.01)
(52) U.S. Cl. ...................................... 366/205; 241/37.5
(58) Field of Classification Search .................. 366/205, 366/206, 314, 601; 241/37.5; 99/348
See application file for complete search history.

(56) References Cited

U.S. PATENT DOCUMENTS

| 3,612,126 | A * | 10/1971 | Emmons et al. ......... 241/199.12 |
| 3,785,579 | A * | 1/1974 | Voglesonger ............... 241/282.1 |
| 5,338,111 | A * | 8/1994 | Trocherie et al. ............. 366/205 |
| 6,350,053 | B1 * | 2/2002 | Morin ........................... 366/205 |
| 7,220,049 | B2 * | 5/2007 | Lee ............................... 366/206 |
| 7,318,666 | B1 * | 1/2008 | Lin ............................... 366/206 |
| 2002/0012288 | A1 * | 1/2002 | Masip et al. .................. 366/205 |
| 2008/0093193 | A1 * | 4/2008 | Eden ........................ 192/129 R |

FOREIGN PATENT DOCUMENTS

| GB | 2417538 A | * | 3/2006 |
| JP | 2001309859 A | * | 11/2001 |
| JP | 2001340238 A | * | 12/2001 |
| JP | 2009112546 A | * | 5/2009 |

* cited by examiner

Primary Examiner — Charles E Cooley
(74) Attorney, Agent, or Firm — Martin Fleit; Paul D. Bianco; Fleit Gibbons Gutman Bongini & Bianco PL

(57) ABSTRACT

This invention provides a safety system for electrically operated kitchen appliances such as blenders, food processors and the like, to protect users from contact with cutting or macerating implements which, in operation of such appliances, are rotated at reasonably high speeds by powerful electric motors. In order to provide a reliable and robust safety system which is economical to manufacture, the invention utilises a detent member (30, 50) which is rotatable with either the motor or the implement (80). A trapping member (110, 130), which is mobile between two positions along the motor's axis of rotation, but which cannot rotate, traps or releases the detent member, depending upon the trapping member's position. The trapping member (110, 130) is moved into the position at which the detent member (30, 50) is released only when a container (100) is correctly inserted into place to contain the implement. The invention also provides an electrically powered kitchen appliance incorporating such a safety system.

9 Claims, 2 Drawing Sheets

SAFETY SYSTEM PREVENTING ROTATION OF UNPROTECTED CUTTING TOOL

FIELD OF THE INVENTION

This invention relates to safety systems and it relates especially, though not exclusively, to such systems for electrically operated kitchen appliances such as blenders, food processors and the like.

BACKGROUND OF THE INVENTION

Many appliances used in the kitchen contain cutting or macerating knives or blades which can be rotated at reasonably high speeds by means of powerful electric motors and thus can present significant risk to users, as well as to children and others who may interfere with unattended appliances, unless appropriate safety measures are incorporated.

Most kitchen appliances manufactured by reputable companies have safety systems intended to protect users, and others, from accidental contact with rotating knives or blades, and most existing systems work reasonably well under most circumstances. However, there is a continual quest for safety systems exhibiting improved security and robustness, and moreover legislation is continually being introduced to ensure that adequate safety standards are established and met. The present invention aims to provide a safety system conforming to all current safety legislation and which, moreover, is user friendly. The invention also aims to provide an electrically powered kitchen appliance incorporating such a safety system.

SUMMARY OF THE INVENTION

According to the invention there is provided a safety system for selectively permitting a motor to drive an implement, within a container, in rotation about an axis; the system comprising a detent member associated with the motor or the implement and rotatable therewith; a trapping member movable between first and second positions, spaced apart in a direction parallel to said axis, for respectively trapping and releasing said detent member; means constraining said trapping member against rotation; means actuated by the container for moving the trapping member into said second position when said container is correctly placed to contain said implement, and means otherwise urging said trapping member into said first position; the system thereby permitting said implement to be driven in rotation by the motor when said container is correctly placed to contain said implement, and otherwise preventing the implement from being so driven.

Preferably, the container comprises a bottomless goblet having a base side-wall adapted to be located in place around said implement by a readily releasable and securable means such as screw threads or a bayonet fixing. By this means, the implement can be utilised with different goblets.

It is further preferred that the means for moving the trapping member is responsive to the lower rim of the side-wall of said bottomless goblet.

The detent member preferably comprises a detent member including a collar-like member with at least outwardly facing tooth and/or at least one socket. In a preferred embodiment, the collar bears a plurality of teeth equally spaced around its periphery.

Preferably, the trapping member comprises an interlock plate, formed with an aperture, of diameter sufficient to accommodate the collar; the aperture being defined by a wall bearing at least one further socket disposed to receive said at least one tooth and/or bearing at least one further tooth disposed to engage in said at least one socket when the interlock plate is so disposed axially along the motor shaft as to surround the collar.

The invention also encompasses a kitchen appliance incorporating a safety system in accordance with any of the foregoing.

BRIEF DESCRIPTION OF THE DRAWINGS

In order that the invention may be clearly understood and readily carried into effect, one embodiment thereof will now be described with reference to the accompanying drawings, of which.

DETAILED DESCRIPTION OF THE INVENTION

Figure 1:
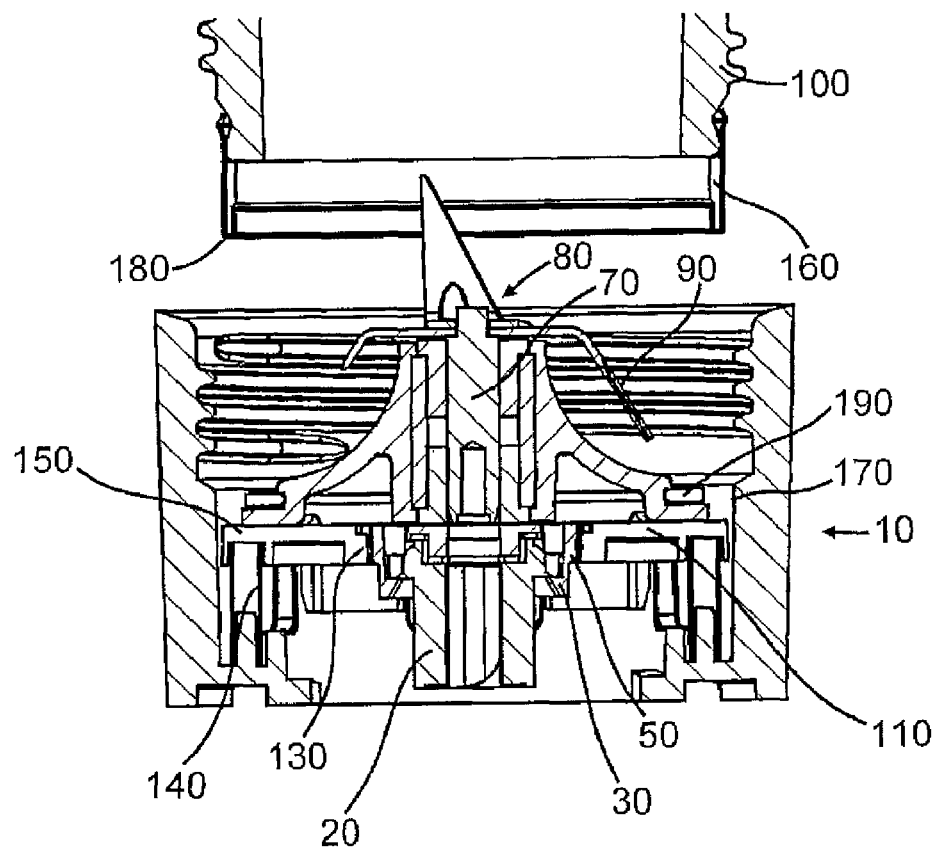
FIG. 1 shows, in cross-sectional view, part of a system in accordance with one example of the invention, with the goblet removed and the implement constrained against rotation.

Referring now to the drawings, in which consistent numbering is adopted throughout, certain components of the system to be described are housed within a base 10 of a domestic electrical appliance; in this case a liquidiser. A drive coupling 20 is configured to be driven in rotation by the vertically disposed output shaft of an electric motor (not shown) mounted in any convenient manner beneath the base 10. The electric motor may be of any type convenient and suitable for use in the context of the appliance in question.

The drive coupling 20 has a detent member associated therewith; such member in this example taking the form of a collar-like housing 30 which is provided, on its annular outer surface 40, with a plurality of equally spaced teeth, or splines, such as 50, for a purpose which will become clear later.

Located in an upper part of the base 10 are further components of the system, including an upwardly-extending drive spindle 70, which is supported conventionally in bearings for rotation in any convenient manner; the spindle 70 being adapted to drive a rotatable implement, such as a cutting tool 80 comprising a plurality of blades 90. The spindle 70 is driven directly by the motor's shaft. Thus, as described to this point, energisation of the motor would result in rotation of the tool 80.

The safety system in accordance with this example of the invention, however, provides that the tool 80 cannot be rotated by the motor, even if it is energised, unless a goblet 100 designed specifically for use with the base 10, is correctly attached thereto.

Figure 3:
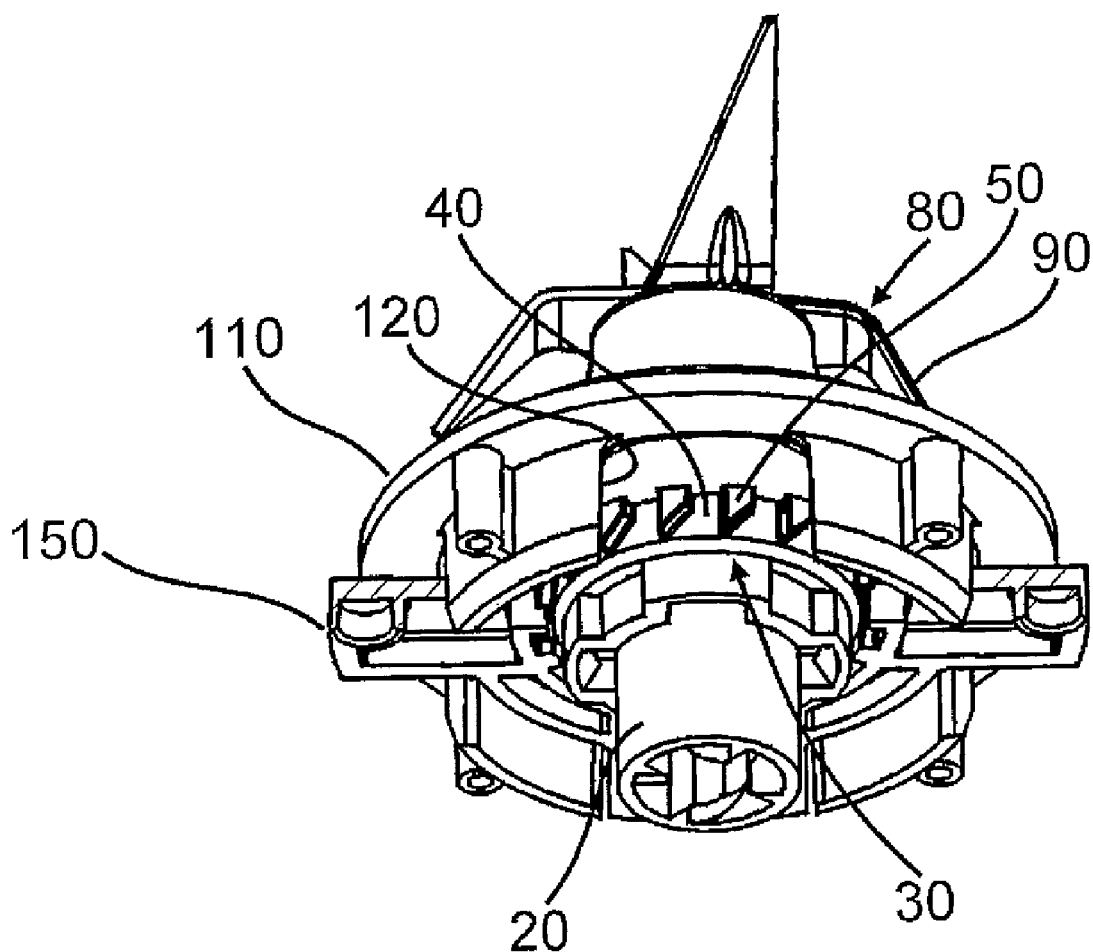
FIG. 3 shows an isometric view of the system in the operational condition of FIG. 2.

The safety system of this example of the invention comprises a trapping member constituted by an interlock plate 110 which is movable to and fro along the spindle 70 (and thus parallel to or (in this case) actually along, the drive axis of the motor), but which is constrained against rotation about that axis, by means which will be more fully described hereinafter. The interlock plate 110 is formed with an aperture sufficiently large in diameter as to be capable of accommodating the collar-like housing 30 of the detent member. The aperture is defined by a circular wall 120 formed with a plurality of sockets 130 designed to receive the outwardly-protruding teeth 50 of the collar-like housing 30 when the interlock plate 110 is disposed axially such as to surround the collar-like housing 30. It will be appreciated that, with the interlock plate 110 so disposed to surround the collar-like housing 30, and since the interlock plate cannot rotate, the motor is prevented from turning the tool 80 because of the meshing of the teeth 50 with the sockets 130. This is therefore a safe condition, and is the one which obtains at all times when the goblet 100 is removed from the base 10. This is the condition shown in FIGS. 1 and 3.

It will be appreciated that the sockets 130 can be regarded as being defined between teeth represented by land portions of the wall 120, and that the teeth 50 can be regarded as defining sockets therebetween in the collar-like housing 30. In essence, all that is required is that the housing 30 and the wall 120 bear complementary components of any convenient kind which can be inter-engaged, by relative axial motion of the housing 30 and the wall 120, to prevent rotation of the housing 30 relative to the wall 120, and the description and claims hereof are intended to be read in that light.

In this example, as shown in FIG. 1, the interlock plate 110 is normally urged upwardly, and thus into its safe position surrounding the collar-like housing 30, by means of a plurality of springs such as 140 bearing against a fixed location in the base housing 10. In this example, there are four springs such as 140 arranged symmetrically around the central axis of the system, and each bearing against a respective arm such as 150, said arms forming part of, and extending radially outward from, the interlock plate 110. The arms 150 thus conform to a cruciform shape, and at least one of them is constrained against rotation, whilst free for axial movement, within a suitably shaped cavity formed in a static part of the base. In this example, all four arms such as 150 are constrained within respective, identical cavities and indeed it is preferred that at least two of the arms, diametrically opposed, are associated with such cavities.

The goblet 100 is open at its base and is formed with a downwardly-dependent skirt 160.

Figure 2:
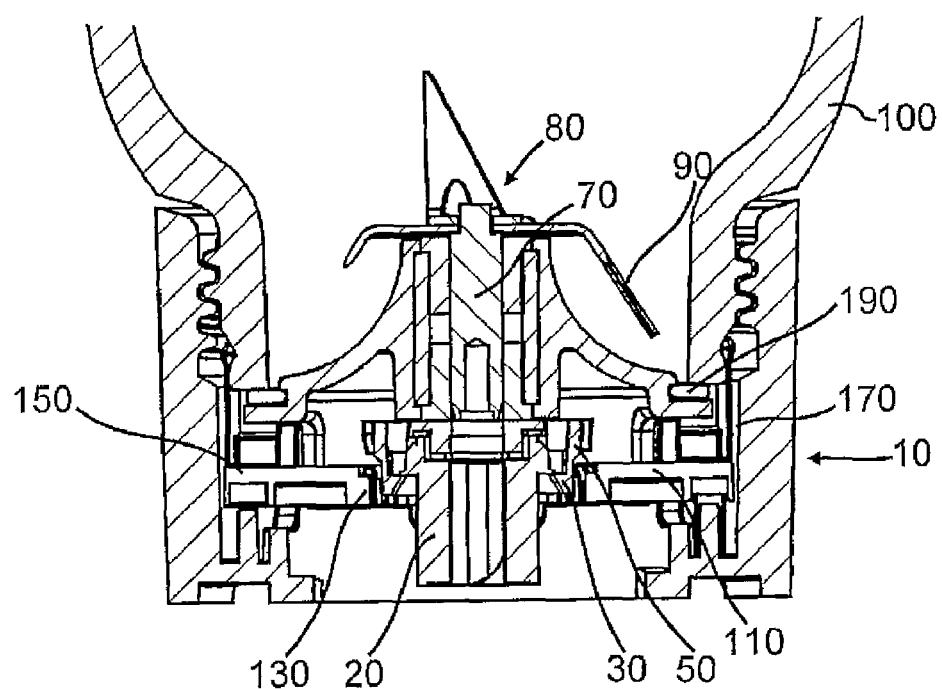
FIG. 2 shows, also in cross-sectional view, the same part of the system with the goblet installed and the implement free to be driven in rotation by the motor.

The arms such as 150 extend sufficiently far radially to enter a region 170 into which a lower rim 180 of the skirt 160 depending from the base of goblet 100 can extend when the goblet is operationally disposed, as shown in FIG. 2, on the base 10, with a seal 190 provided to resist leakage into the base 10 of fluid materials processed in the goblet 100.

In FIG. 2, the goblet 100 is shown as being screwed into position on the base 10, but it will be appreciated that any convenient arrangement for operationally attaching the container to the base can be used. For example, in some embodiments, a bayonet connection may be preferred.

As shown in FIG. 2, when the goblet 100 is screwed fully home into its operational location on the base 10, its lower rim 180 progresses sufficiently far into the region 170 as to contact the arms such as 150 of interlock plate 110 and urges the plate downwards, against the force of the springs such as 140, forcing the interlock plate 110 downwards, sufficiently far as to clear the collar-like housing 30, thereby disengaging the teeth 50 from the socket 130 and freeing the tool 80 for rotation when the motor is energized.

In this condition, when the electric motor is actuated, the rotational drive which it imparts to drive coupling 20 is transmitted directly to the tool 80 which, at such time, is safely disposed within, and surrounded by, the goblet 100.

If the goblet 100 is absent, the interlock plate 110 remains in its safety (uppermost) condition, surrounding the collar-like housing 30 and in such circumstances, even if power is inadvertently supplied to the electric motor and a cutting implement 80 has been left in place, a safe situation obtains because the motor drive is prevented from operating the tool 80 by the engagement of teeth 30 in the sockets 130, and the constraint against rotation of the interlock plate 110.

It will be appreciated that the system as described herein provides protection not only in circumstances where the electric motor might be actuated by mischievous, malicious or inadvertent operation of a power switch, but also in circumstances where a short circuit or other electrical mischance or breakdown actuates the motor independently of the power switch.

With general reference to the scope of this invention, it is pointed out that, whilst, in the specific example of the invention described above with reference to the drawings, the teeth 30 and the sockets 130 form complete and complementary sets extending all around the outer surface 40 of the collar-like housing 30 and around the wall 120 respectively, other arrangements are possible. In particular, there may be differing numbers of teeth and sockets in the two sets, and/or either or both sets of teeth/sockets need not be continuously disposed over a full 360 degrees. It is in any event preferred, however, that symmetrical arrangements of teeth and sockets are utilised, as this promotes reliable operation and longevity of the system. Moreover, such teeth and sockets as are provided may be shaped, profiled, chamfered or otherwise configured in known manner so as to promote smooth and reliable meshing and unmeshing as the interlock plate 110 moves into and/or out of the safe position.

Furthermore, alternative mechanisms are readily available which do not employ teeth and sockets at all. For example, the detent and trapping members may include one or more axially extending pegs intended, in the trapped position, to be inserted into one or more axial receiving apertures, as appropriate.

Moreover, although the particular example of the invention described with respect to the drawings utilises a coaxial configuration for the motor and the rotatable implement, it will be appreciated that the respective axes of these components could be displaced laterally from one another if desired, by means for example of gearing and/or any other convenient form of drive translation system.

It will further be appreciated that the detent member may be rotatably associated with either the implement or the motor.

The invention claimed is:

1. A safety system for selectively permitting a motor to drive an implement, within a container, in rotation about an axis; the system comprising a detent member associated with the motor or the implement and rotatable therewith; a trapping member movable between first and second positions, spaced apart in a direction parallel to said axis, for respectively trapping and releasing said detent member; means constraining said trapping member against rotation; means actuated by the container for moving the trapping member into said second position when said container is correctly placed to contain said implement, and means otherwise urging said trapping member into said first position; the system thereby permitting said implement to be driven in rotation by the motor when said container is correctly placed to contain said implement, and otherwise preventing the implement from being so driven; wherein:
   (a) the container comprises a bottomless goblet having a base side-wall adapted to be located in place around said implement by a readily releasable and securable means such as screw threads or a bayonet fixing;
   (b) the means for moving the trapping member is responsive to a lower rim of the side-wall of said bottomless goblet;
   (c) the detent member comprises a collar with at least one outwardly facing tooth and/or at least one socket; and (d) the trapping member comprises an apertured interlock plate; said aperture being sufficiently large to accommodate the collar, and being defined by a wall formed with at least one further socket disposed to receive said at least one tooth, and/or at least one further tooth disposed to engage with said at least one socket, when the interlock plate is so disposed axially along a motor shaft as to surround the collar.

2. A system according to claim 1 wherein the collar bears a plurality of teeth equally spaced around its periphery.

3. A system according to claim 1 wherein said interlock plate is provided with at least one arm extending radially outward thereof and said base comprises means defining at least one cavity in which said arm or arms can move axially whilst being constrained against rotation.

4. A kitchen appliance incorporating a safety system in accordance with claim 1.

5. A safety system for permitting a rotatable cutting implement, mounted on a motor-driven shaft comprising part of an electrically-powered kitchen appliance, to rotate only when a container is securely fitted to the appliance and housing the implement; the system comprising a detent member associated with a motor or the implement and rotatable therewith; a non-rotatable trapping member linearly movable relative to said shaft between a normally-occupied first position, in which the trapping member traps said detent member and prevents it from rotating, and a second position in which the detent member disengages from the trapping member and is free to rotate; said trapping member carrying at least one arm means extending outwardly therefrom and utilized to constrain said trapping member against rotation, the system further including spring means engaging said arm means and permanently urging said trapping member toward said first position; said arm means being contactable by the container to move the trapping member against the urging of said spring means and into said second position only when said container is secured to the kitchen appliance to safely house said implement; the detent member and the trapping member each bearing respective components configured to inter-engage, whilst said trapping member occupies said first position, to prevent rotation of the detent member relative to the non-rotatable trapping member; the system thereby permitting said implement to be rotated only with the trapping member moved to its second position; said spring means returning the trapping member to said first position when said container is removed from said kitchen appliance.

6. A system according to claim 5, wherein the container comprises a bottomless goblet having a base side-wall adapted to be releasably but securely fitted to the appliance to house the implement, and wherein the arm means is contactable by a lower rim of the side-wall of said bottomless goblet.

7. A system according to claim 6, wherein the trapping member comprises an interlock plate formed with an aperture sufficiently large to accommodate the detent member; and wherein facing surfaces of the aperture and the detent member respectively bear said components configured to inter-engage.

8. A system according to claim 5, wherein the trapping member comprises an interlock plate formed with an aperture sufficiently large to accommodate the detent member; and wherein facing surfaces of the aperture and the detent member respectively bear said components configured to inter-engage.

9. A kitchen appliance incorporating a safety system in accordance with claim 5.

\* \* \* \* \*